A. ISKE.
Extension Troughs for Wagons.
No. 137,371. Patented April 1, 1873.
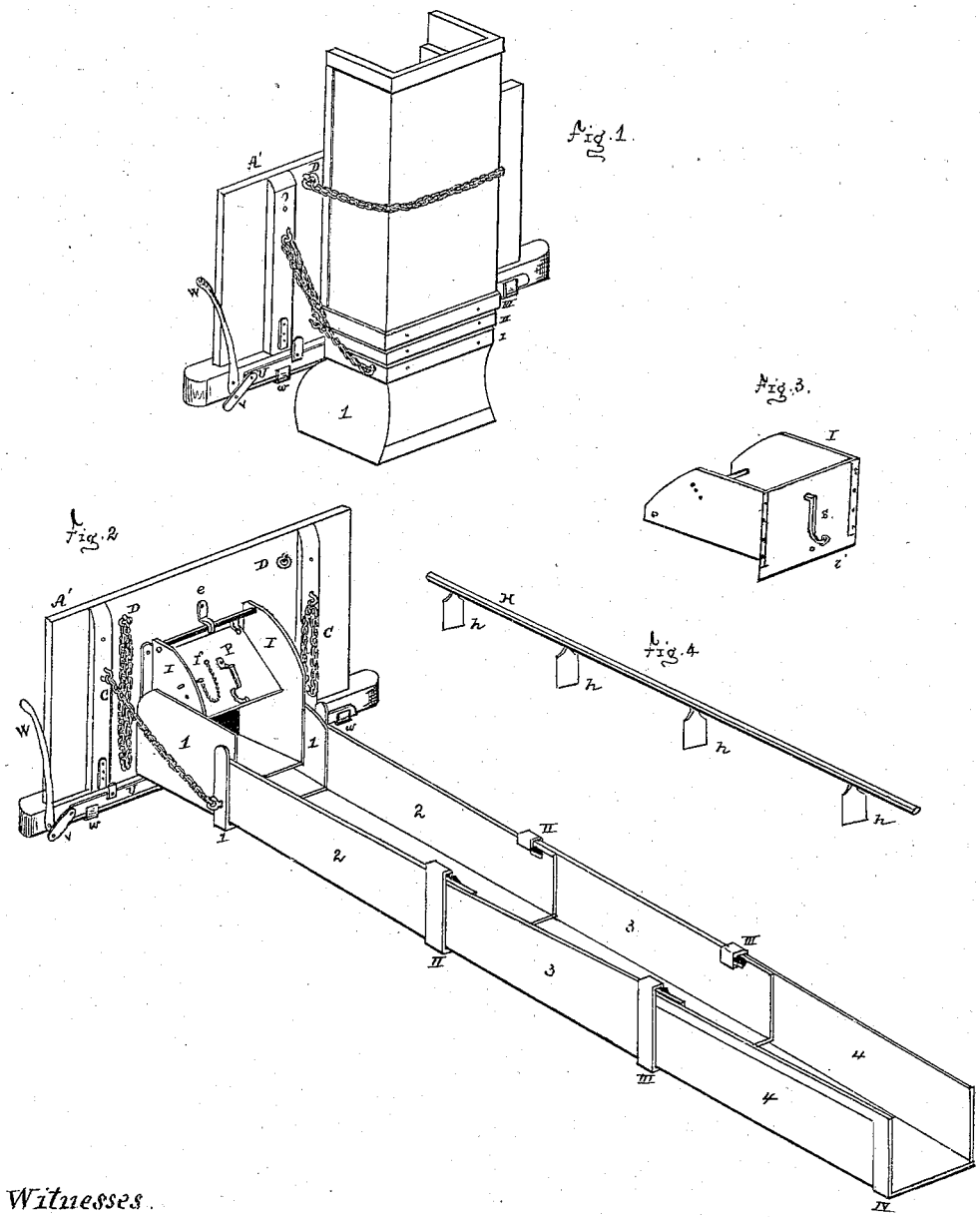

UNITED STATES PATENT OFFICE.

ANTHONY ISKE, OF LANCASTER, PENNSYLVANIA, ASSIGNOR TO MARTIN L. HERR, OF SAME PLACE.

IMPROVEMENT IN EXTENSION TROUGHS FOR WAGONS.

Specification forming part of Letters Patent No. 137,371, dated April 1, 1873; application filed February 7, 1873.

*To all whom it may concern:*

Be it known that I, ANTHONY ISKE, of the city of Lancaster, in the State of Pennsylvania, have invented certain Improvements in an Open Extension-Trough Attachment for Discharging Coal, of which the following is a specification:

The object of this invention is to obviate the serious objection to extension sliding chutes or tubes, or open extension or sliding spouts or troughs that have any cross-connection from one side to the other, so as to obstruct the inside of the same in any manner whatever, as experience has demonstrated that no spout or tube can be extended across a pavement ten or more feet wide, and yet inclined sufficiently to allow the coal to pass from the cart or wagon through the same to the hole leading to the cellar without the aid of a hoe or shovel, and such hoe or shovel cannot be used to any advantage unless the trough is continuous and perfectly free from cross-obstructions; and, while the sliding sections should be so arranged as to be properly secured in their sliding action, there should be sufficient play to allow them of being adjusted a few feet to the right and left, as is frequently necessary, and save the usual forward pulls and backing of the horse or horses, in order to get the proper position.

The accompanying drawing illustrates the construction and application of this trough, as now combined with the detachable mouth-piece I or chute and end-gate A of my former patent, No. 121,459, dated December 5, 1871.

Figure 1 shows the sections slid into each other and suspended to the end-gate. Fig. 2 shows the same extended across a pavement. Fig. 3 shows a modification of my former mouth-piece I, but this and the end-gate are substantially the same, only changed the better to adapt them severally to the trough. This Fig. 3 and Fig. 4 I do not claim, but use in connection with the trough.

The combined trough consists of four parts, the first and second being affixed together. The short piece 1 fits over the detachable mouth-piece I, into which latter the small door P opens from the wagon for the discharge of the coal. There is a band, marked by the numerical I, around the bottom and up the two sides. This band has a ring or eye on each side for a chain, C. This chain is passed over a hook on the vertical braces O of the end-gate A, and by a terminal hook adjusted by connecting with the desired link in the chain on each side to hold the forward end of the trough. The remaining sections, 3 and 4, have their forward end—*i. e.*, next the wagon—provided with bands II and III. These bands form a kind of hook or sliding loop to embrace the section on the upper edge next it, which holds the sections together and forms a guide in their sliding action one into the other. There is a stay button or stop to prevent one section to be drawn further than necessary from the other when at its fullest extension. Fig. 2 illustrates this extension. There is also a terminal band, IV, on section 4, to give it more strength. When these sections are pushed together and raised vertically on the rear of the end-gate, as seen in Fig. 1, a chain is shown to hold the upper portion. This chain is attached at one end to a ring, D, on one side. The other end of the chain has a hook by which it is fastened to the other ring D on the opposite side of the end-gate. The chains and hooks afford great facility and a wide range of adjustment for the trough to incline it to the right or left of the center line.

As it is found to require the use of a hoe or shovel when a long spout is used, to prevent crushing the curb or pavement by driving upon it, as you must to discharge from a short spout or tube, as formerly used, I use a handle, H, with four hoes, *h*, attached at an angle, with the handle so inclined that by inserting it into the trough the coals are moved at four points simultaneously, and speedily removed with ease. This I simply mention as being more desirable than an ordinary hoe and useful in connection with the trough.

To prevent the fine coaldust from sifting through the crack, the sheet-iron lining of the bottom of the wagon extends out so that the projecting bottom $i$ of the detachable mouth-piece I enters under it. There is a spring, S, shown, which locks into a catch and holds the under side. There are also a series of holes, shown on the side, to receive a bolt on a chain, $f$, affixed to the small door P on the end-gate. This bolt is thrust through an eye on the side of the gate and through one of said holes in the mouth I, which holds said small door in the adjusted position. The same bolt also holds said door P shut by being passed through the eye of the extended handle on said door at its lower edge.

I am aware that jointed chutes attached to a cart or wagon through which coal may be discharged, or short sliding tubes have been used, as also folding troughs, as shown in my former patent. Such I have found to be defective, and do not claim. The object attained by this invention is a long, open, unobstructed extensible trough; therefore

What I claim as my invention is—

The combination of sections 1, 2, 3, and 4, when constructed with bands II III, so as to embrace the sliding segments, which can be drawn out against stops to form a continuous open trough, or slid into each other and suspended to the end-gate by chains, the whole arranged as herein described, for the purpose set forth.

ANTHONY ISKE.

Witnesses:
JNO. M. AMWEG,
JACOB STAUFFER.